Dec. 3, 1929.  H. F. CONGABLE  1,737,959

IRRIGATION PIPE VALVE

Filed April 4, 1929

INVENTOR.
HENRY F. CONGABLE.
BY
ATTORNEY

Patented Dec. 3, 1929

1,737,959

UNITED STATES PATENT OFFICE

HENRY F. CONGABLE, OF OAKLAND, CALIFORNIA

IRRIGATION PIPE VALVE

Application filed April 4, 1923. Serial No. 267,247.

The invention forming the subject matter of this application relates to irrigation pipe valves.

There are a large number of openings spaced through the whole length of an irrigation pipe so as to permit the regulation of the water flow in accordance with the need for irrigation at different sections of a field. Ordinarily a gate valve is used to control the flow through each opening, said valve consisting of a slidable plate disposed on the outside of the pipe. The working parts of this gate valve quite often become clogged or covered with rust and mud thereby rendering the opening and closing of the irrigation valve extremely difficult.

The primary object of my invention is to provide a valve for irrigation pipes in which the disk controlling the opening of the valve is disposed inside of the pipe and is completely protected from any rust or dirt.

Another object of the invention is to provide a valve for an irrigation pipe which may be readily inserted into outlet openings of the irrigation pipe and in which the valve regulating elements are disposed inside of the pipe but in which means are provided to control the movement of said regulating elements from the outside.

Another object of the invention is to provide an irrigation pipe valve which is highly useful and simple in construction. Convenience of arrangement, lightness and comparative cheapness of manufacture are further objects which have been borne in mind in the production and development of the invention.

With the foregoing and other objects in view my invention resides in the combination and arrangement of parts and in the details of construction hereinafter described and claimed, it being understood that changes in the precise embodiment of the invention hereinafter disclosed may be made within the scope of the appended claims without departing from the spirit of the invention.

The invention is clearly illustrated in the accompanying drawing in which.

Figure 1:
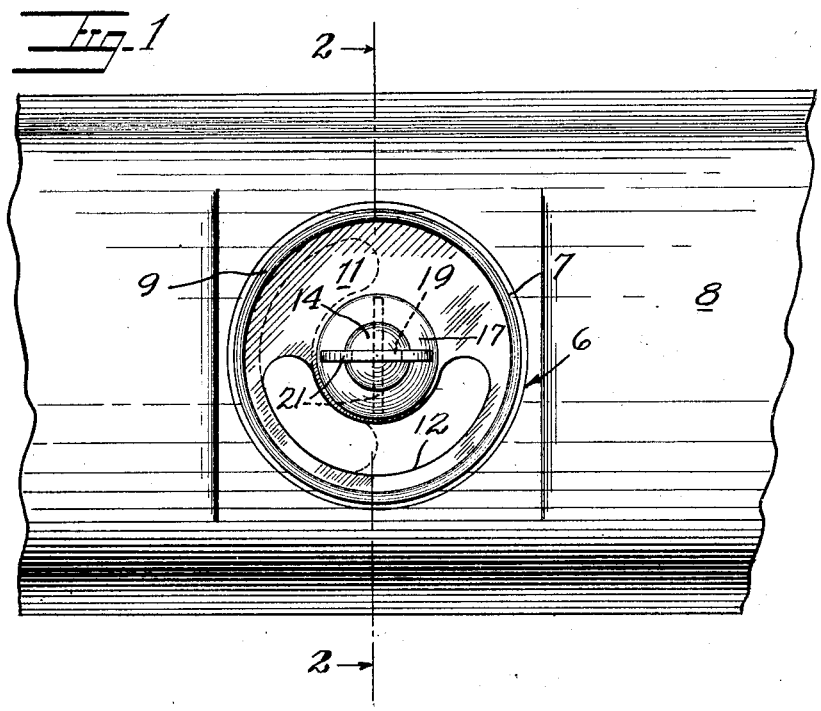
Figure 1 is a fragmentary view of the irrigation pipe showing my valve attached thereto.
Figure 2:
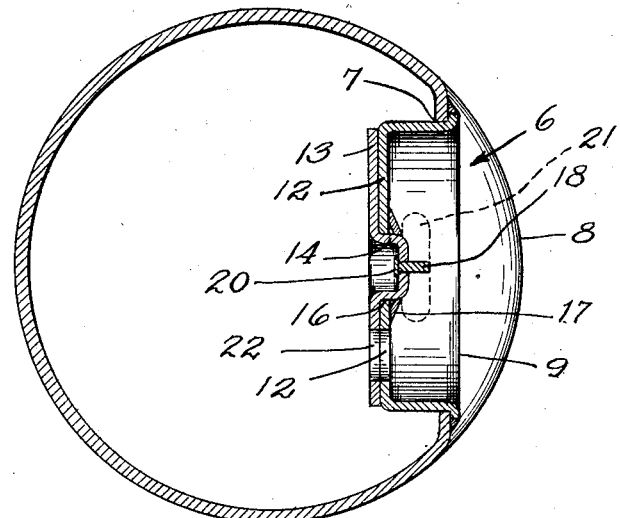
Figure 2 is a sectional view of the irrigation pipe and the valve therein, the section being taken along the line 2—2 of Figure 1.

Referring to the accompanying drawings wherein similar reference characters designate similar parts throughout, the various figures described above adequately illustrate my invention and the following detailed description is commensurate with the above mentioned drawings in enabling an artisan to construct and assemble the constituent parts of the same.

In carrying out my invention the irrigation valve denoted in its entirety by the numeral 6 is secured to an outlet opening 7 of an irrigation pipe 8. The outlet opening 7 is preferably a circular hole in which is stressed a cylindrical body 9 forming part of my valve 6. The end of the cylindrical body 9 protruding into the irrigation pipe 8 is terminated by the end portion 11 forming an integral part of the cylindrical body 9. An arcuate aperture 12 is cut through the end plate 11, the arc of the aperture being concentric with the cylindrical body 9. The water is discharged from the irrigation pipe 8 through the aperture 12.

In order to partly or completely obstruct the flow of water through the aperture 12 a disk valve 13 is secured in close proximity to the end portion 11. The disk valve 13 is so designed that a central hub 14 thereof snugly fits into a corresponding hole 16 in the center of the end portion 11. The hub 14 extends into the cylindrical body 9.

The disk valve 13 is resiliently locked into place by means of pressure exerted upon a conical washer 17 bearing against the face of the end portion 11. The central hole in said conical washer 17 is large enough to receive the hub 14 therein. A wing key 18 extends through a slot 19 in the hub 14 the inside end of the key being riveted over as at 20 so as to prevent the accidental removal of the key from the hub. An enlarged head 21 of the wing key extends partly into the slot 19 and bears against the conical washer 17, thereby preventing the movement of the hub out of the end portion 11.

An arcuate valve opening 22 of about the size of the aperture 12 is cut through the disk valve 13 the arc of the opening 22 having the same radius as the arcuate aperture 12 so that by turning the disk valve 13 the opening 22 may be brought into or out of registry with the aperture 12.

In operation the device is pressed into the circular opening 7 in the irrigation pipe 8, and welded or soldered in place. In order to shut off the valve the enlarged head 21 of the key 18 is turned by means of a wrench or the like until the valve opening 22 is out of alignment with the aperture 12 so that the disk valve 13 entirely obstructs the flow of water through the aperture 12. The regulation of the valve opening is effected by turning the enlarged head 21 and the disk valve 13 therewith to the extent that is found necessary to permit the desired flow of water out of the irrigation pipe.

It will be recognized that a particularly simple device is provided to control the flow of water from an irrigation pipe; the device combines light weight and well protected moving parts with a ruggedness of construction and positiveness of operation, especially adapting it for its use. Being of unitary character the device requires no careful setting up and lends itself to effective application by the labor ordinarily available.

Having thus described my invention what I now claim as novel and desire to secure by Letters Patent is:

I claim:

1. A valve of the character described comprising a cup-shaped body having a concentric arcuate aperture and a central hole in the closed end thereof; a disk having an aperture therein complementary to said first aperture; a hub on the disk rotatably protruding through said central hole, said hub having a transverse slot cut therethru, a frusto-conical washer positioned around said hub and bearing against the end of the cup-shaped body; and a key fixedly secured in said transverse slot, an enlarged head on the key bearing against the central portion of said conical washer, said disk being rotated by the turning of said key so as to move said second aperture relatively to said first aperture.

2. A valve of the character described comprising a cup-shaped body having an aperture and a central hole in the end thereof, a disk having an aperture therein complementary to said first aperture; a hub on the disk rotatably protruding through said central hole, said hub having a transverse slot cut therethrough, a frusto-conical washer positioned around said hub and bearing against a face of the end of the cup-shaped body, a key fixedly secured in said transverse slot, and an enlarged head on the key bearing against the central portion of said conical washer so as to draw the disk in close proximity to the other face of said end of the cup-shaped body, said disk being rotated by the turning of the key so as to move said second aperture relatively to said first aperture.

3. A valve of the character described comprising a hollow cylindrical body adapted to be secured into an opening in an irrigation pipe, an end plate terminating an end of said body, a disk adjacent to the face of said end plate outside of said body, a hub having a transverse slot cut therethrough; and means in the slot bearing against the inside face of said end plate so as to maintain said disk in close proximity of said end plate, said disk and said end plate having complementary arcuate apertures therein, the valve opening being regulated by the rotation of said disk so as to bring the aperture in the disk into or out of alignment with the aperture in the plate.

4. A valve of the character described comprising a hollow cylindrical body adapted to be secured into an opening in an irrigation pipe, flush with outside periphery thereof, an end plate terminating an end of said body, a disk adjacent to the face of said end plate outside of said body, a hub having a transverse slot cut therethrough; a resilient frusto-conical washer around said hub, and means in the slot bearing against said washer so as to maintain said disk in close proximity of said end plate, said disk and said end plate having complementary arcuate apertures therein, the valve opening being regulated by the rotation of said disk so as to bring the aperture in the disk into or out of alignment with the aperture in the plate.

In testimony whereof I affix my signature.

HENRY F. CONGABLE.